(12) United States Patent
Chatterjee et al.

(10) Patent No.: US 7,299,265 B2
(45) Date of Patent: Nov. 20, 2007

(54) DISTRIBUTED COMPUTING SYSTEM SELECTING A SERVICE MASTER FOR EACH SERVICE BY AN ELECTED GLOBAL MASTER FOR MANAGING REQUESTS FOR THAT SERVICE

(75) Inventors: Surojit Chatterjee, Foster City, CA (US); Sambit Mishra, Newark, CA (US)

(73) Assignee: Oracle International Corporation, Redwood Shores, CA (US)

( * ) Notice: Subject to any disclaimer, the term of this patent is extended or adjusted under 35 U.S.C. 154(b) by 968 days.

(21) Appl. No.: 10/455,922

(22) Filed: Jun. 6, 2003

(65) Prior Publication Data

US 2004/0249942 A1    Dec. 9, 2004

(51) Int. Cl.
*G06F 15/16* (2006.01)
(52) U.S. Cl. .................. 709/208; 709/209; 709/203
(58) Field of Classification Search ............. 709/208, 709/209, 223, 224, 226, 217, 203; 713/320; 714/47; 370/352
See application file for complete search history.

(56) References Cited

U.S. PATENT DOCUMENTS

| | | | |
|---|---|---|---|
| 6,889,248 B1* | 5/2005 | Scheer | 709/209 |
| 2002/0156862 A1* | 10/2002 | Zhou | 709/217 |
| 2003/0169728 A1* | 9/2003 | Choi | 370/352 |
| 2003/0177240 A1* | 9/2003 | Gulko et al. | 709/226 |
| 2003/0200473 A1* | 10/2003 | Fung | 713/320 |
| 2003/0212927 A1* | 11/2003 | Navar et al. | 714/47 |
| 2004/0044730 A1* | 3/2004 | Gockel et al. | 709/203 |

* cited by examiner

*Primary Examiner*—Le Hien Luu
(74) *Attorney, Agent, or Firm*—Bobby K. Truong; Hickman Palermo Truong & Becker LLP

(57) ABSTRACT

A mechanism is disclosed for managing a distributed computing system in which a plurality of services are provided by a plurality of members. Initially, one of the members of the system is elected as the global master for the system. Thereafter, the global master selects a service master (where a service master comprises a member of the system) for each of the services provided by the system, such that each service has an associated service master. Each service master may be selected based upon an associated set of service master selection criteria. Once selected, each service master manages requests for the service with which the service master is associated. In this manner, services and the requests for the services are effectively managed.

56 Claims, 6 Drawing Sheets

DISTRIBUTED COMPUTING SYSTEM SELECTING A SERVICE MASTER FOR EACH SERVICE BY AN ELECTED GLOBAL MASTER FOR MANAGING REQUESTS FOR THAT SERVICE

FIELD OF THE INVENTION

This invention relates generally to computers, and more particularly to a mechanism for managing a distributed computing system.

BACKGROUND

Distributed computing systems are used in a wide variety of implementations to provide computing services on a large scale. Distributed systems offer a number of advantages, including scalability (additional members may be added to the system to provide additional capability), high availability (if one member breaks down, another member can be called upon to provide the services of the broken member), and flexibility (a number of different members may be called upon to provide a service). One drawback of distributed systems, however, is that they are complex and can be difficult to manage. This is especially true if the distributed system has a large number of members, and each member can provide multiple services, such that there is service overlap among the members.

To facilitate system management, a master election mechanism has been developed, whereby one of the members is elected as the "master" of the distributed system. Once elected, the master is given certain management responsibilities and privileges. Thereafter, the master is charged with the task of managing the processing of service requests in the entire system. While this arrangement does allow the system to be managed, it imposes a heavy burden on the master. If the system becomes large enough or complex enough, the master can become a significant bottleneck. As a result, this arrangement does not scale well. Since scalability is one of the advantages of having a distributed system, this approach undermines some of the benefits of having a distributed system in the first place. Given the shortcomings of the current approach, an improved mechanism is needed to manage a distributed system more effectively and efficiently.

DETAILED DESCRIPTION OF EMBODIMENT(S)

System Overview

Figure 1:
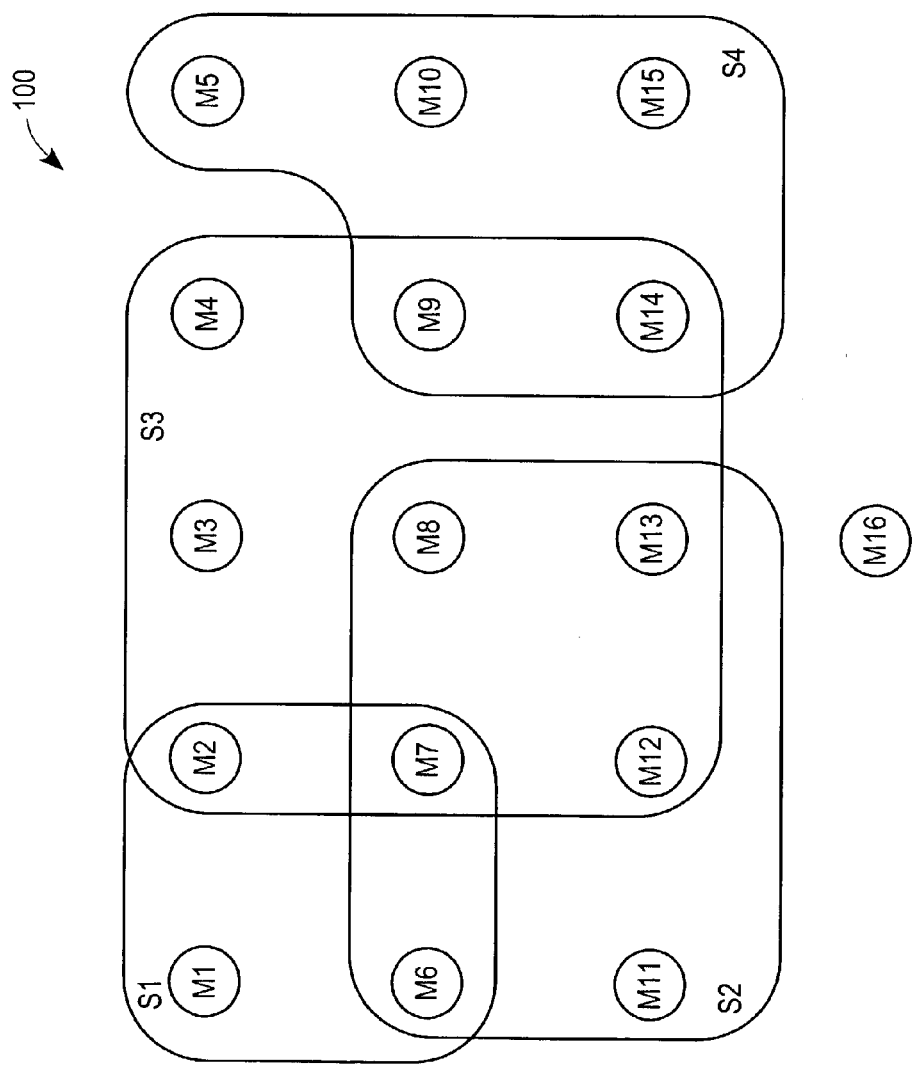
FIG. 1 is a block diagram of a sample distributed computing system in which one embodiment of the present invention may be implemented.

With reference to FIG. 1, there is shown a block diagram of a sample distributed computing system 100 in which one embodiment of the present invention may be implemented. For the sake of illustration, the invention will be described in the context of system 100. However, it should be noted that the invention is not so limited. Rather, the concepts taught herein may be applied to any distributed computing system comprising any number of members and providing any number of services.

Members

As shown, system 100 comprises sixteen members M1-M16. As used herein, the term member refers broadly to any component or entity that can participate in a distributed computing system. A member may be a physical entity, such as a node on a network, a computer, a portion of a computer, a peripheral, etc. A member may also be a logical or functional entity, such as a computing process, a thread within a process, etc. A member may even be a group of entities. Basically, any component or entity that can participate in a distributed computing system can be a member. System 100 may comprise a mixture of physical and logical entities such that some of the members are physical entities while other members are logical entities.

In one embodiment, the various members M1-M16 are interconnected via a network (for the sake of simplicity, this network is not shown). The network may be a local area network (LAN), a wide area network (WAN), an intranet, the Internet, the World Wide Web, or any other network. The network enables any member to communicate with any other member. This does not require, however, that each member have a direct link to every other member. A member may communicate with another member through one or more intervening members. For example, member M1 may not have a direct link to member M15, but it may be able to communicate with M15 via intervening member M8. In one embodiment, in addition to being able to communicate with other members, each member is also aware of the existence and the "liveliness" of all of the other members in the system 100.

Services

Each member may provide zero or more services. As used herein, the term service refers broadly to any functionality or facility that can be invoked. Examples of services include, but are not limited to, functions or methods, database instances, special capabilities (e.g. the ability to serve images rather than just plain text), etc. In system 100, four services S1-S4 are provided. Which service is provided by which members is shown by the boundary lines. For example, service S1 is provided by members M1, M2, M6, and M7, service S4 is provided by members M5, M9, M10, M14, and M15, and so on. Some members, for example M16, can provide no services, while other members, for example M1, provide just one service S1, while other members, for example M7, provide multiple services S1, S2, S3. Because some members can provide multiple services, and because different members can provide the same service, there can be service overlap between the various members, as shown by the overlapping boundary lines of FIG. 1.

This complex arrangement of members and services can be quite difficult to manage. For example, if there is a request for service S3, which member should initially field this request? Further, which member should perform the actual processing to satisfy the request? These and many other management questions can arise. To address these issues, a management scheme is needed.

SYSTEM MANAGEMENT OVERVIEW

Global Master Election

In one embodiment, management of system 100 is implemented as follows. Initially, one (or more than one if so desired) of the members is elected to be the global master for the entire system 100. In one embodiment, any of the members may be elected the global master. Alternatively, if so desired, the members eligible to be global master may be limited to only a subset of the members. In one embodiment, election of the global master is carried out by way of an arbitration scheme in which all of the members participate. Such master election schemes are well known, and any known scheme may be used.

Service Master Selection

Once elected, it is up to the global master to select one (or more than one if so desired) service master for each of the services provided by the system 100, such that each service has an associated service master. In system 100, there are four services S1, S2, S3, S4; thus, four service masters are selected. In one embodiment, the members that are eligible to be service master for a service are the members that provide that service (note: this is not required; for purposes of the present invention, any member can be service master for any service). For such an embodiment, members M1, M2, M6 and M7 are eligible to be service master for service S1, members M6, M7, M8, M11, M12, M13 are eligible to be service master for service S2, and so on. It is up to the global master to select, for each service, one of the eligible members to be service master for that service. Because a member may be eligible to be service master for multiple services, the global master may select the same member to be service master for multiple services (e.g. the global master may select member M7 to be service master for services S1, S2, and S3).

Service Master Selection Criteria

In selecting a service master, the global master may apply certain service master selection criteria. For each service, a different set of service master selection criteria may be applied. For example, for service S1, service master selection criteria C1 may be applied, whereas for service S2, service master selection criteria C2, which is different from C1, may be applied. It should be noted, though, that each service need not have a different set of service master selection criteria. If so desired, the same set of service master selection criteria may be applied for multiple services.

The global master applies a set of service master selection criteria to an eligible member to determine whether that member qualifies to be the service master for a particular service. Only if the member satisfies the criteria in a set of service master selection criteria will it even be given service master consideration. In some instances, more than one eligible member may qualify to be service master for a service. In such cases, the global master may apply one or more tie breaking conditions to select one of the qualified members as service master. For purposes of the present invention, any tie breaking condition may be used.

A set of service master selection criteria may comprise one or more criteria of any type. For example, one criterion may be that the eligible member must be currently "alive". Another criterion may be a resource availability condition (e.g. CPU usage of the eligible member must be less than 50%, the eligible member must have at least 3 MB of available memory, the eligible member must have at least 1 GB of available hard disk storage, the eligible member must not be servicing more than five requests at this time, etc.). Another criterion may be that the eligible member must be running a certain version or higher of a certain set of software. These are just examples of some possible criteria. For purposes of the present invention, any type of criteria may be included in a set of service master selection criteria.

As noted previously, a set of service master selection criteria may comprise multiple criteria. In such a case, the multiple criteria may be strung together to form a logical expression (e.g. criteria one AND criteria two AND NOT criteria three). This logical expression is evaluated by the global master at the time of selecting a service master to determine whether an eligible member qualifies to be a service master.

Service Master Functionality

Once a member is selected to be the service master for a service, it can perform any type of desired management function for that service. For example, the service master can act as a gateway to receive all requests for that service. It can process all of the requests itself, or delegate the requests to other members that provide that service for processing, or process some of the requests itself and delegate the other requests. If it does delegate the requests to other members, the service master can do so in such a way that it balances the workload across those other members. In addition, the service master may monitor the service on the other members, report any irregularities or error conditions, and make adjustments to the service on those other members as needed. These and many other management functions may be performed by the service master.

A service master for a service may exercise some management control over other members that provide that particular service. Note though that, in one embodiment, the service master is master over the other members only with respect to that service, and not necessarily for other aspects. To illustrate, suppose that M1 is selected to be service master for service S1. Thus, M1 can exercise management control over member M6 with regard to service S1. M6 also provides service S2. M1 has no management control over M6 for purposes of S2. Instead, the service master for service S2 will exercise control over M6 for purposes of S2. Thus, the management control exercised by a service master is service-based.

By having a service master for each service provided by system 100, management of the services is not concentrated in one global master, but rather is distributed among a plurality of service masters. Among other benefits, this enables the system 100 to scale better. As a result, service-based masters enable system 100 to be managed more effectively and efficiently.

REPOSITORY

To facilitate management of system 100, there is maintained a repository of information. In one embodiment, this repository is global and persistent. The repository is global in the sense that it can be accessed by any of the members in system 100, and in one embodiment, can be updated by any of the members in the system 100. The repository is persistent in that the information stored therein survives system startups, shutdowns, and reboots.

Members, Services, and Status Blocks

Figure 2:
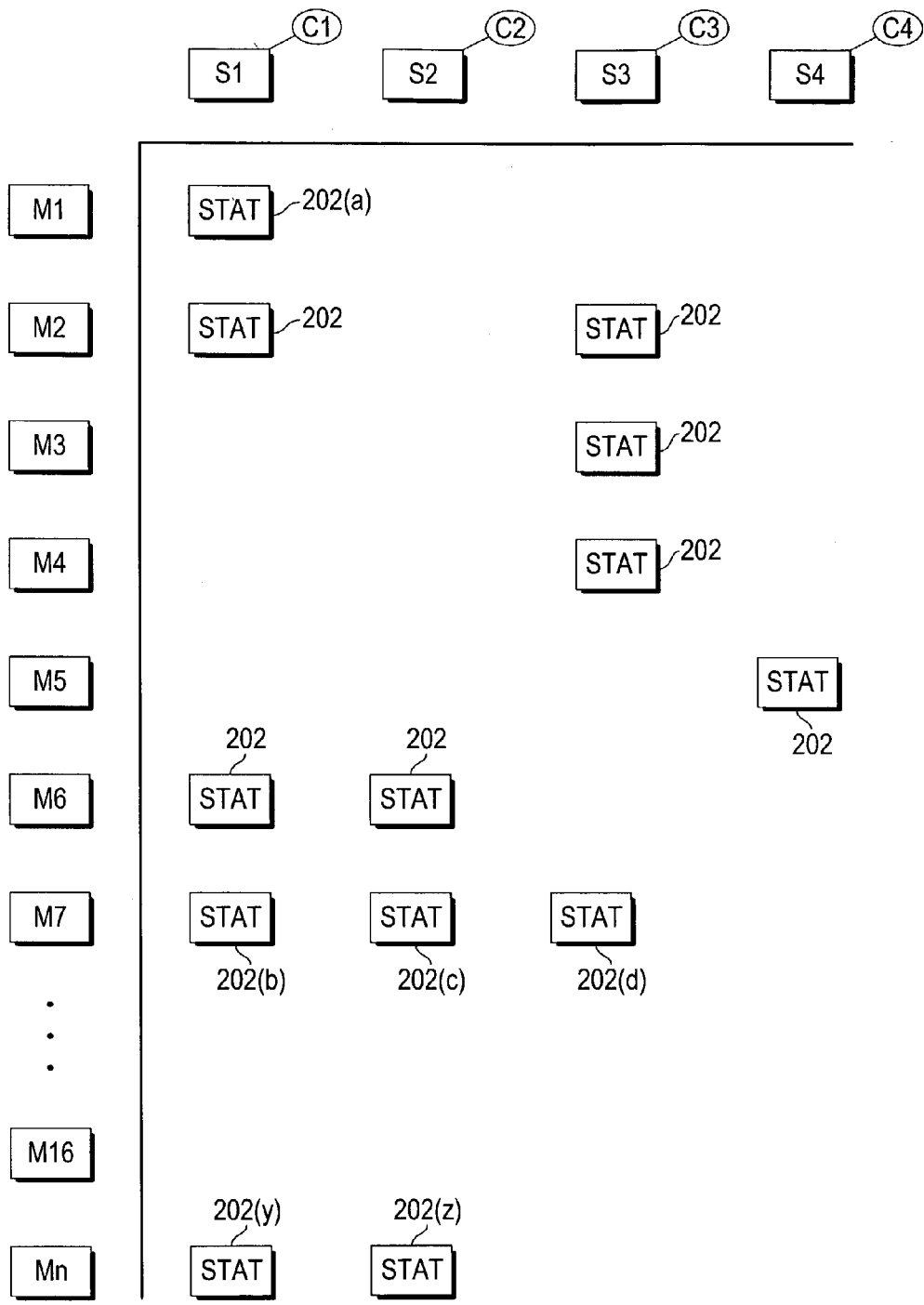
FIG. 2 is a diagrammatic representation of a sample repository for the system of FIG. 1, in accordance with one embodiment of the present invention.

FIG. 2 shows a diagrammatic representation of a sample repository for system 100, in accordance with one embodiment of the present invention. In FIG. 2, the repository is represented as a matrix, with the list of services S1-S4 provided by system 100 shown across the top, and the list of members M1-M16 in the system 100 shown down the left side. The repository contains a complete listing of all of the members and all of the services in the distributed computing system 100.

At the intersection of certain members and services, there is a status block 202. The presence or absence of a status block 202 indicates whether a particular service is provided by a particular member. For example, member M1 has a status block 202($a$) at its intersection with service S1 and no status block at the intersection of any of the other services S2-S4. This means that member M1 provides only service S1. Similarly, member M7 has three status blocks 202($b$), 202($c$), 202($d$), one each at the intersections of services S1, S2, and S3. This means that member M7 provides services S1-S3 but not S4. Represented in this manner, it is easy to determine from the repository which services are provided by which members.

A status block 202 may contain any type of information. For example, a status block 202 may comprise information on whether a particular service on a particular member is currently "alive" or not. A status block 202 may also comprise information indicating which member is a service master. For example, if M7 is service master for service S1, then the status block 202($b$) at the intersection M7 and S1 may contain some information indicating that M7 is a service master for that service S1. With this information in the repository, it is possible for any member to easily determine which member is the service master for each service. This and any other type of information may be included in a status block 202.

In one embodiment, the repository may be updated by various members for various purposes. For example, a member may update information pertaining to itself. As an example, when a new member (e.g. Mn) is added to the system 100, it registers itself with the repository to indicate the services that it provides. Thus, if Mn provides services S1 and S2, then it creates a new entry Mn for itself on the left side of the matrix, and stores two status blocks 202($y$), 202($z$), one each at the intersections of S1 and S2. The information in these status blocks 202($y$), 202($z$) would indicate that services S1 and S2 are currently "alive" on member Mn.

The repository may also be updated by the global master. For example, when the global master selects a particular member to be a service master for a particular service, it may update the appropriate status block to indicate service master status. As an example, if the global master selects M7 as the service master for service S1, then it may update status block 202($b$) to indicate service master status.

The repository may also be updated by various members to change the "alive" status of other members. As noted previously, in one embodiment, each member is aware of the liveliness of the other members. If a member (whether it be the global master, a service master, or some other member) detects that another member is no longer "alive", or that a service on another member is no longer "alive", it can update the repository to reflect this change in status. Thus, in one embodiment, the repository is maintained not by a single member but by the collection of members.

Service Master Selection Criteria

In addition to member, service, and status information, the repository, in one embodiment, further comprises one or more sets of service master selection criteria C1-C4. Each set of criteria C1-C4 is associated with one or more of the services S1-S4. As shown in FIG. 2, C1 is associated with S1, C2 with S2, C3 with S3, and C4 with S4. Each set of criteria may be different from the other sets, some sets of criteria may be the same, or all sets of criteria may be the same. In one embodiment, the sets of service master selection criteria are specified by a system administrator. As will be described in greater detail in a later section, these sets of criteria are applied by the global master in selecting the service masters.

MEMBER OVERVIEW

Figure 3:
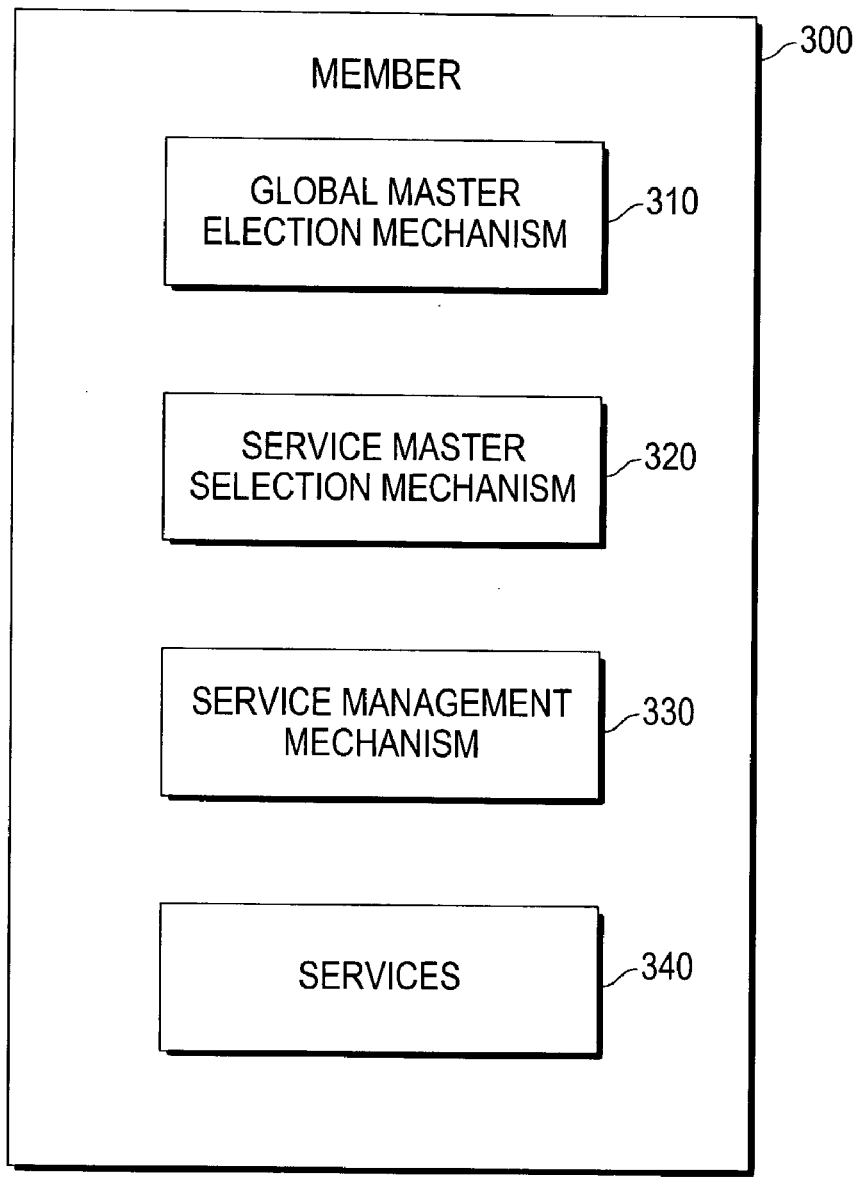
FIG. 3 is a block diagram of a representative member showing some basic member components.

With reference to FIG. 3, there is shown a functional block diagram of a member in accordance with one embodiment of the present invention. Member 300 of FIG. 3 is a representative member of the members of system 100, showing some of the basic member components. Since member 300 is just a representative member, each member of system 100 may have more or fewer components than member 300.

As shown in FIG. 3, member 300 comprises a global master election mechanism 310. In one embodiment, every member in system 100 comprises this mechanism 310. Mechanism 310 enables each member 300 to perform some basic functions. One basic function is to self-register the member 300 with the repository to specify which services are provided by the member 300. Mechanism 310 also enables the member 300 to ascertain the existence and the "liveliness" of all of the other members in the system 100. In addition, mechanism 310 enables member 300 to participate in the election of a global master for the system 100. Basically, mechanism 310 enables each member 300 to participate and to act as a member in system 100.

Member 300 may further optionally comprise service master selection mechanism 320. In one embodiment, this mechanism 320 is invoked only if the member 300 is selected to be the global master. If a member 300 is ineligible and hence can never be global master, then the member 300 need not include mechanism 320. Basically, mechanism 320 enables a member 300, if elected to be global master, to select a service master for each service provided by the distributed computing system 100. The operation of mechanism 320 will be described in detail in a later section.

Member 300 may further optionally comprise one or more service management mechanisms 330 (for the sake of simplicity, only one mechanism 330 is shown). In one embodiment, this mechanism 330 is invoked only if the member 300 is selected to be a service master for a particular service. If a member is ineligible and hence can never be service master for any service, then member 300 need not include mechanism 330. If a member 300 is eligible to be service master for a plurality of different services, then it may comprise a plurality of different service management mechanisms 330, with each mechanism 330 corresponding to a different service. Basically, mechanism 330 enables a member 300 to manage requests for a particular service within system 100. In managing the requests, the mechanism 330 may perform any desired management functions, e.g. process requests, delegate requests to other members, load balance, monitor services, etc. The functionality of each mechanism 330 may be customized for each service.

Member 300 may further optionally comprise one or more services 340. These services are invoked when a member 300 is called upon to process a service request. If a member (e.g. M16) provides no services, then it need not incorporate any services 340. On the other hand, if a member (e.g. M7) provides multiple services, then that member may comprise multiple services 340.

For purposes of the present invention, components/mechanisms 310, 320, 330, 340 may be implemented using any desired technology. For example, components/mechanisms 310, 320, 330, 340 may be implemented using hardware logic components (e.g. ASIC's). Alternatively, the functionality of components/mechanisms 310, 320, 330, 340 may be derived via software (i.e. by having one or more processors execute one or more sets of computer instructions). In addition, a combination of hardware and software may be used (e.g. some components may be implemented in hardware while other components are implemented in software). This and all other implementations are within the scope of the present invention.

OPERATION

Figure 4:
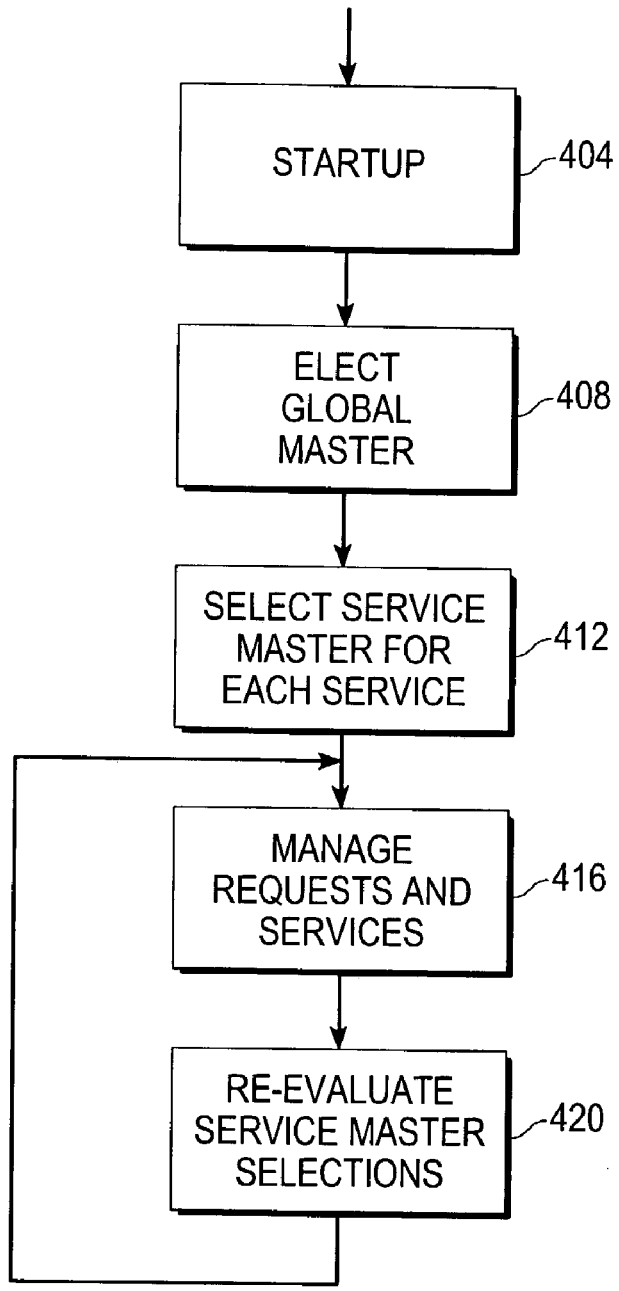
FIG. 4 is a flow diagram illustrating the operation of the system of FIG. 1, in accordance with one embodiment of the present invention.
Figure 5:
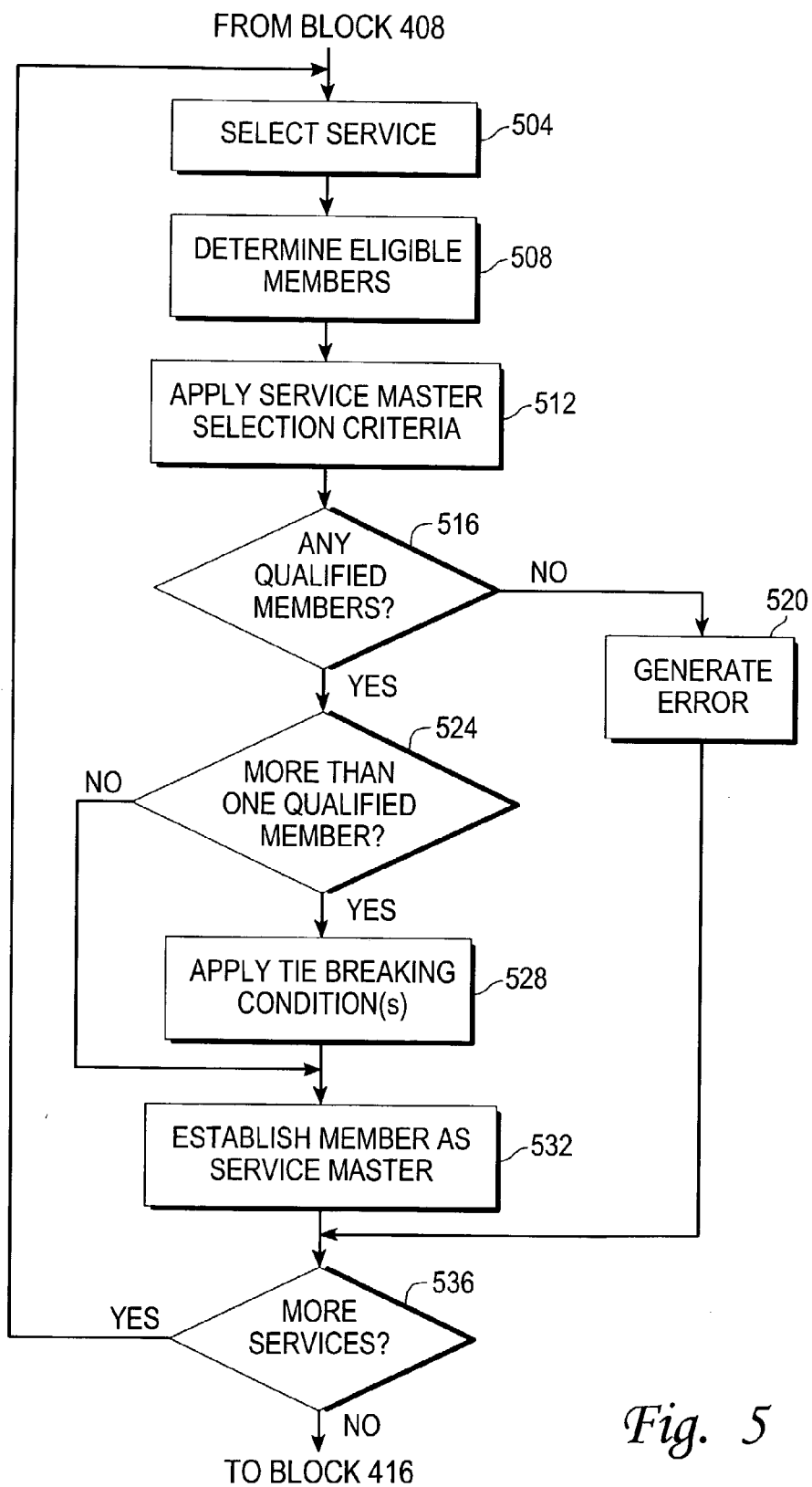
FIG. 5 is a flow diagram illustrating the manner in which a global master selects service masters, in accordance with one embodiment of the present invention.

With reference to FIGS. 1-3, and the flow diagrams of FIGS. 4-5, the operation of the distributed computing system 100 in accordance with one embodiment of the present invention will now be described. As shown in FIG. 4, operation begins with system startup (block 404). During startup, each member 300 invokes its global master election mechanism 310 (FIG. 3). With this mechanism 310, each member 300 performs some basic initialization functions, including registering the member with the repository. This entails adding the member ID and address to the repository, specifying which services are provided by the member, and specifying the current statuses of these services. Since each member 300 registers itself with the repository, by the end of the startup process, the repository will be fully populated with a complete list of the members and services in the distributed computing system 100.

Thereafter, while still invoking the global master election mechanism 310, each member participates in a global election/arbitration scheme to elect (block 408 of FIG. 4) a global master for the system 100. As noted previously, such election schemes are well-known, and any known scheme may be used. In one embodiment, the scheme implemented in Oracle Cluster Synchronization Services is used. According to this scheme, whenever a member registers itself with the distributed system 100, that member is assigned a number. This number is incremented with each additional member. When it comes time to elect a global master, the currently "alive" member with the lowest number is elected as the global master. If that global master dies, crashes, etc., the currently "alive" member with the next lowest number is elected as the new global master. That way, the global master is the member that has been "alive" for the longest period of time.

Once a global master is elected, the global master updates the repository to indicate that it is now global master. That way, any member can consult the repository at any time to ascertain which member is the global master.

After a member is elected global master, that member invokes its service master selection mechanism 320 (FIG. 3) to select (block 412 of FIG. 4) a service master for each service provided by the distributed computing system 100. The process of selecting the service masters is shown in greater detail in FIG. 5.

The global master begins the service master selection process by consulting the repository, and selecting (block 504) one of the services (e.g. S1) in the repository. In addition, the global master retrieves from the repository the set of service master selection criteria (e.g. C1) associated with the selected service. Thereafter, the global master proceeds to determine (block 508) which members are eligible to be service master for the selected service. In one embodiment, the eligible members are those members that provide the selected service. Thus, to determine the eligible members, the global master consults the repository and retrieves therefrom the list of members that provide the selected service.

The global master then applies (block 512) the set of service master selection criteria to each of the eligible members to determine (block 516) whether any of the eligible members are qualified to be service master for the selected service. If no qualified members are found, the global master generates (block 520) an error message to indicate that it is unable to establish a service master for the selected service. The global master then proceeds to block 536.

On the other hand, if one or more qualified members are found, then the global master proceeds to determine (block 524) whether there are multiple qualified members. If so, the global master applies (block 528) one or more tie breaking conditions to choose one of the qualified members as the service master. Once a member is selected (either by way of tie breaker or by virtue of having only one qualified member), the global master establishes (block 532) that member as the service master for the selected service. To do so, the global master updates the repository to indicate that the selected member is now the service master for the selected service. In addition, the global master sends a message to the other members that provide the selected service to inform those members that the selected member is now service master for the selected service. The service master is thus established.

Thereafter, the global master determines (block 536) whether there are other services for which service masters need to be established. If so, the global master loops back to block 504 to select another service, and to establish a service master for that service. This process continues until all of the services in the repository have been selected and processed. After the service masters are established, the distributed computing system 100 is ready for regular operation.

Returning to FIG. 4, during regular operation, the global master and the service masters work together to manage (block 416) requests for services. In one embodiment, the global master acts as a directory service to direct requests to the proper service masters. Specifically, when the global master receives a service request from a requester, the global master determines which service is being requested by the request. The global master then determines (by consulting the repository) which member has been selected as the service master for that service, determines the address for that member, and then sends that address to the requester. The requestor thereafter uses that address to request the service from the service master directly. Thus, the global master does not process the service request, but rather tells the requestor which service master to send the request to to obtain processing and management. By leaving the processing and management of requests to the service masters, the global master prevents itself from being overloaded, and hence, becoming a bottleneck in the system 100.

When a service master receives a service request from a requestor, it determines which service is being requested by the request (a member could be service master for multiple services), and invokes the service management mechanism 330 (FIG. 3) corresponding to that service. In managing the request, the service master may choose to do the processing itself to satisfy the request. In that case, the service master invokes the appropriate service 340 to process the request. On the other hand, the service master may choose to delegate the request to another member that provides the service. If that is the case, the service master forwards the request to another member. When delegating requests, the service master may perform some load balancing functions. In addition, the service master may perform some other management functions such as service monitoring, error reporting, etc. Overall, the service master may perform any desired function for properly managing requests for a particular service.

During the course of regular operation, the status and condition of the various members can and probably will change. As a result of these changes, some of the selected service masters may no longer satisfy their associated service master selection criteria (for example, the CPU usage or the memory available on the service master may no longer be at the required levels). To ensure that the service masters continue to satisfy their associated service master selection criteria, the global master re-evaluates (block 420 of FIG. 4) each service master on a frequent basis. This re-evaluation may be done on an event-driven basis (e.g. each time the global master directs a request to a particular service master), or it may be done on a regular basis (e.g. every few seconds).

During re-evaluation, the global master chooses a member that is the service master for a particular service. The global master then retrieves from the repository the set of service master selection criteria associated with that particular service, and applies those criteria to the member to see if the criteria are still satisfied. If so, the member remains as the service master. If not, the global master selects another member to be service master for that particular service. This selection may be carried out in the same manner as that described above in connection with FIG. 5. Namely, the global master: determines which members are eligible to be service master for the particular service; applies the set of service master selection criteria to each of the eligible members to determine which ones are qualified; applies a set of tie breaking condition(s), if necessary; and establishes one of the qualified members as the new service master for the particular service. In this manner, the global master ensures that the service master selections are kept current. By having current service masters, and by having the global master work with the service masters in the manner described above, the distributed computing system 100 can be managed effectively and efficiently.

HARDWARE OVERVIEW

Figure 6:
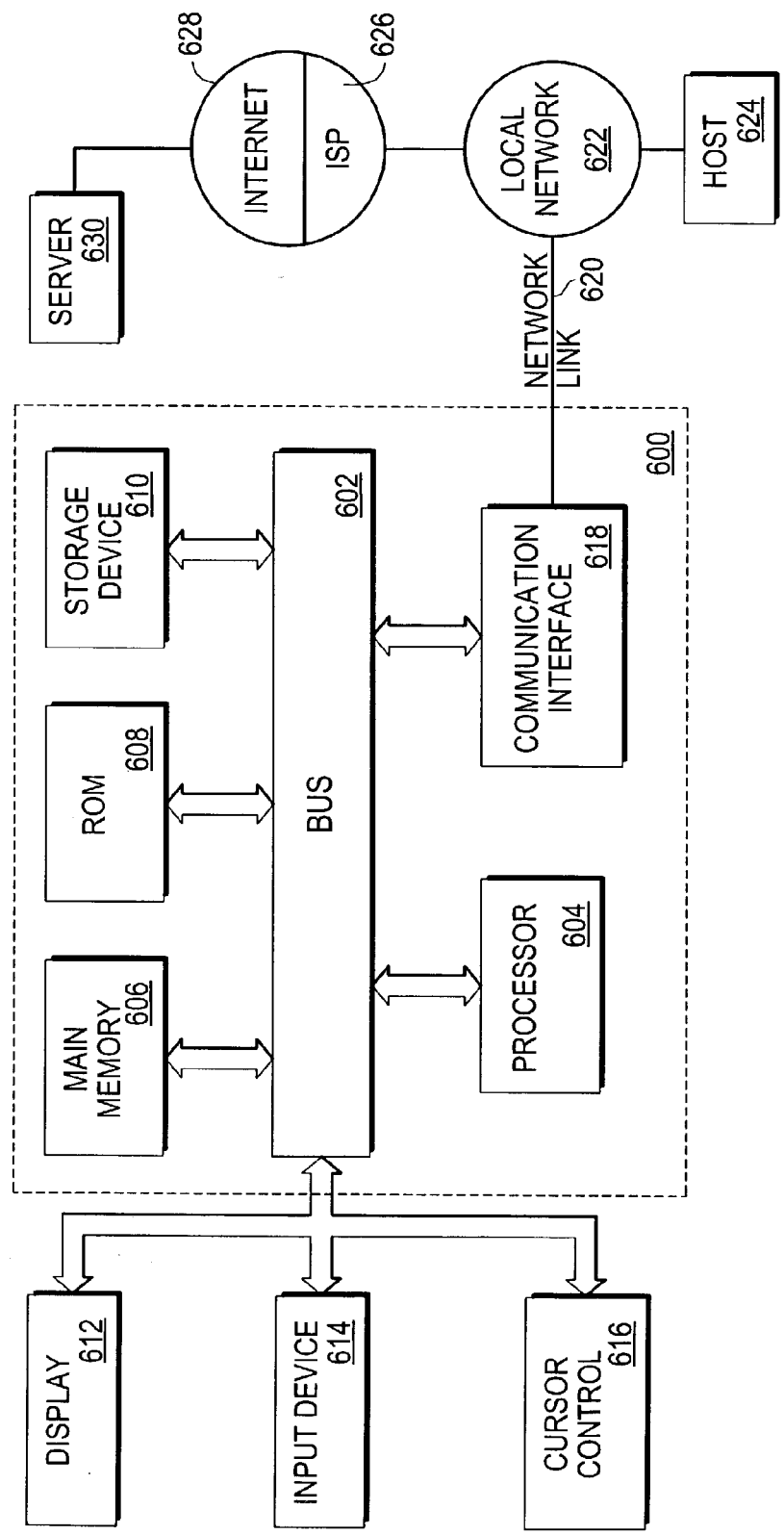
FIG. 6 is a hardware block diagram of a computer system in which one embodiment of the present invention may be implemented.

As noted previously, the functionality of each member 300 may be implemented in software as one or more sets of instructions executable by one or more processors. FIG. 6 shows a hardware block diagram of a computer system 600 in which this software embodiment may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 may also be further used to store temporary variables or other intermediate information during execution of instructions by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

According to one embodiment, the functionality of the present invention is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution. In this manner, computer system 600 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims.

What is claimed is:

1. In a distributed computing system comprising a plurality of members, the distributed computing system providing a plurality of different services, with each member providing zero, one, or a plurality of the services, such that each service can be provided by one or a plurality of the members, a method implemented within the distributed computing system, comprising:

electing at least one member from the plurality of members to act as a global master for the distributed computing system; and selecting, by the global master, a service master for each of the plurality of services provided by the distributed computing system, such that each particular service has an associated service master which is responsible for managing requests for that particular service in the distributed computing system, and wherein each service master comprises a member from the plurality of members.

2. The method of claim 1, wherein a first service provided by the distributed computing system has a first set of service master selection criteria associated therewith, and wherein selecting comprises:

determining a first set of one or more members that are eligible to be service master for the first service;

applying the first set of service master selection criteria to the first set of members to derive a first set of one or more qualified members that are qualified to be service master for the first service; and establishing a member from the first set of qualified members as service master for the first service.

3. The method of claim 2, wherein the first set of service master selection criteria includes a resource availability condition.

4. The method of claim 2, wherein the first set of service master selection criteria includes a logical expression that is to be evaluated.

5. The method of claim 2, wherein the first set of service master selection criteria includes a software version specification.

6. The method of claim 2, wherein the first set of members contains members that provide the first service.

7. The method of claim 2, wherein a second service provided by the distributed computing system has a second set of service master selection criteria associated therewith, wherein the second set of service master selection criteria is different from the first set of service master selection criteria, and wherein selecting further comprises:

determining a second set of one or more members that are eligible to be service master for the second service;

applying the second set of service master selection criteria to the second set of members to derive a second set of one or more qualified members that are qualified to be service master for the second service; and establishing a member from the second set of qualified members as service master for the second service.

8. The method of claim 7, wherein the first set of members contains members that provide the first service, wherein the second set of members contains members that provide the second service, and wherein the first set of members and the second set of members can have one or more members in common such that one or more members can provide both the first service and the second service.

9. The method of claim 7, wherein the same member can be established as service master for both the first service and the second service.

10. The method of claim 1, further comprising:

maintaining a persistent repository, wherein the repository comprises information specifying the plurality of services provided by the distributed computing system, and which services are provided by which members.

11. The method of claim 10, wherein selecting comprises:

consulting the repository to determine a set of one or more members that are eligible to be service master for a first service; and establishing a member in the set of members as service master for the first service.

12. The method of claim 11, wherein the set of members that are eligible to be service master for the first service contains members that provide the first service.

13. The method of claim 10, wherein the persistent repository further comprises one or more sets of service master selection criteria, and wherein each set of service master selection criteria is associated with at least one of the plurality of services.

14. The method of claim 13, wherein the repository comprises a first service and a first set of service master selection criteria associated with the first service, and wherein selecting comprises:
   consulting the repository to determine a first set of one or more members that are eligible to be service master for the first service;
   applying the first set of service master selection criteria to the first set of members to derive a first set of one or more qualified members that are qualified to be service master for the first service; and
   establishing a member from the first set of qualified members as service master for the first service.

15. The method of claim 14, wherein the first set of members contains members that provide the first service.

16. The method of claim 14, wherein the repository further comprises a second service and a second set of service master selection criteria associated with the second service, wherein the second set of service master selection criteria is different from the first set of service master selection criteria, and wherein selecting further comprises:
   consulting the repository to determine a second set of one or more members that are eligible to be service master for the second service;
   applying the second set of service master selection criteria to the second set of members to derive a second set of one or more qualified members that are qualified to be service master for the second service; and
   establishing a member from the second set of qualified members as service master for the second service.

17. The method of claim 16, wherein the first set of members contains members that provide the first service, wherein the second set of members contains members that provide the second service, and wherein the first set of members and the second set of members can have one or more members in common such that one or more members can provide both the first service and the second service.

18. The method of claim 16, wherein the same member can be established as service master for both the first service and the second service.

19. The method of claim 1, wherein a first member has been selected by the global master to be service master for a first service, and wherein the method further comprises:
   determining, by the global master, whether the first member should continue to be service master for the first service; and
   in response to a determination that the first member should not continue to be service master for the first service, selecting, by the global master, another member to be service master for the first service.

20. The method of claim 1, wherein a first member has been selected by the global master to be service master for a first service, wherein the first service has a first set of service master selection criteria associated therewith, and wherein the method further comprises:
   applying, by the global master, the first set of service master selection criteria to the first member to determine whether the first member still qualifies to be service master for the first service; and
   in response to a determination that the first member no longer qualifies to be service master for the first service, selecting, by the global master, another member to be service master for the first service.

21. In a distributed computing system comprising a plurality of members, the distributed computing system providing a plurality of different services, with each member providing zero, one, or a plurality of the services, such that each service can be provided by one or a plurality of the members, a computer readable storage medium for interfacing with at least one particular member of the distributed computing system, the computer readable storage medium comprising:
   instructions for causing the particular member to interact with at least some of the other members of the distributed computing system to elect a global master for the distributed computing system, wherein the particular member can be elected as the global master; and
   instructions for causing the particular member, if elected to be the global master, to select a service master for each of the plurality of services provided by the distributed computing system, such that each particular service has an associated service master which is responsible for managing requests for that particular service in the distributed computing system, and wherein each service master comprises a member from the plurality of members.

22. The computer readable storage medium of claim 21, wherein a first service provided by the distributed computing system has a first set of service master selection criteria associated therewith, and wherein the instructions for causing the particular member to select comprises:
   instructions for causing the particular member to determine a first set of one or more members that are eligible to be service master for the first service;
   instructions for causing the particular member to apply the first set of service master selection criteria to the first set of members to derive a first set of one or more qualified members that are qualified to be service master for the first service; and
   instructions for causing the particular member to establish a member from the first set of qualified members as service master for the first service.

23. The computer readable storage medium of claim 22, wherein the first set of service master selection criteria includes a resource availability condition.

24. The computer readable storage medium of claim 22, wherein the first set of service master selection criteria includes a logical expression that is to be evaluated.

25. The computer readable storage medium of claim 22, wherein the first set of service master selection criteria includes a software version specification.

26. The computer readable storage medium of claim 22, wherein the first set of members contains members that provide the first service.

27. The computer readable storage medium of claim 22, wherein a second service provided by the distributed computing system has a second set of service master selection criteria associated therewith, wherein the second set of service master selection criteria is different from the first set of service master selection criteria, and wherein the instructions for causing the particular member to select further comprises:
   instructions for causing the particular member to determine a second set of one or more members that are eligible to be service master for the second service;
   instructions for causing the particular member to apply the second set of service master selection criteria to the second set of members to derive a second set of one or more qualified members that are qualified to be service master for the second service; and instructions for causing the particular member to establish a member from the second set of qualified members as service master for the second service.

28. The computer readable storage medium of claim 27, wherein the first set of members contains members that provide the first service, wherein the second set of members contains members that provide the second service, and wherein the first set of members and the second set of members can have one or more members in common such that one or more members can provide both the first service and the second service.

29. The computer readable storage medium of claim 27, wherein the same member can be established as service master for both the first service and the second service.

30. The computer readable storage medium of claim 21, wherein the distributed computing system further comprises a persistent repository, the repository comprising information specifying the plurality of services provided by the distributed computing system, and which services are provided by which members, and wherein the instructions for causing the particular member to select comprises:
    instructions for causing the particular member to consult the repository to determine a set of one or more members that are eligible to be service master for a first service; and
    instructions for causing the particular member to establish a member in the set of members as service master for the first service.

31. The computer readable storage medium of claim 30, wherein the set of members that are eligible to be service master for the first service contains members that provide the first service.

32. The computer readable storage medium of claim 21, wherein the distributed computing system further comprises a persistent repository, the repository comprising information specifying the plurality of services provided by the distributed computing system, which services are provided by which members, and one or more sets of service master selection criteria, with each set of service master selection criteria associated with at least one of the plurality of services, and wherein the instructions for causing the particular member to select comprises:
    instructions for causing the particular member to consult the repository to determine a first set of one or more members that are eligible to be service master for a first service;
    instructions for causing the particular member to apply a first set of service master selection criteria associated with the first service to the first set of members to derive a first set of one or more qualified members that are qualified to be service master for the first service; and
    instructions for causing the particular member to establish a member from the first set of qualified members as service master for the first service.

33. The computer readable storage medium of claim 32, wherein the first set of members contains members that provide the first service.

34. The computer readable storage medium of claim 32, wherein the instructions for causing the particular member to select further comprises:
    instructions for causing the particular member to consult the repository to determine a second set of one or more members that are eligible to be service master for a second service;
    instructions for causing the particular member to apply a second set of service master selection criteria associated with the second service to the second set of members to derive a second set of one or more qualified members that are qualified to be service master for the second service; and
    instructions for causing the particular member to establish a member from the second set of qualified members as service master for the second service;
    wherein the second set of service master selection criteria is different from the first set of service master selection criteria.

35. The computer readable storage medium of claim 34, wherein the first set of members contains members that provide the first service, wherein the second set of members contains members that provide the second service, and wherein the first set of members and the second set of members can have one or more members in common such that one or more members can provide both the first service and the second service.

36. The computer readable storage medium of claim 34, wherein the same member can be established as service master for both the first service and the second service.

37. The computer readable storage medium of claim 21, wherein the particular member selects a first member to be service master for a first service, and wherein the computer readable storage medium further comprises:
    instructions for causing the particular member to determine whether the first member should continue to be service master for the first service; and
    instructions for causing the particular member to select, in response to a determination that the first member should not continue to be service master for the first service, another member to be service master for the first service.

38. The computer readable storage medium of claim 21, wherein the particular member selects a first member to be service master for a first service, wherein the first service has a first set of service master selection criteria associated therewith, and wherein the computer readable storage medium further comprises:
    instructions for causing the particular member to apply the first set of service master selection criteria to the first member to determine whether the first member still qualifies to be service master for the first service; and
    instructions for causing the particular member to select, in response to a determination that the first member no longer qualifies to be service master for the first service, another member to be service master for the first service.

39. In a distributed computing system comprising a plurality of members, the distributed computing system providing a plurality of different services, with each member providing zero, one, or a plurality of the services, such that each service can be provided by one or a plurality of the members, a particular member within the distributed computing system, comprising:
    a mechanism for interacting with at least some of the other members of the distributed computing system to elect a global master for the distributed computing system, wherein the particular member can be elected as the global master; and
    a mechanism, which is invoked if the particular member is elected to be the global master, for selecting a service master for each of the plurality of services provided by the distributed computing system, such that each particular service has an associated service master which is responsible for managing requests for that particular service in the distributed computing system, and wherein each service master comprises a member from the plurality of members.

40. The particular member of claim 39, wherein a first service provided by the distributed computing system has a first set of service master selection criteria associated therewith, and wherein the mechanism for selecting comprises:
a mechanism for determining a first set of one or more members that are eligible to be service master for the first service;
a mechanism for applying the first set of service master selection criteria to the first set of members to derive a first set of one or more qualified members that are qualified to be service master for the first service; and
a mechanism for establishing a member from the first set of qualified members as service master for the first service.

41. The particular member of claim 40, wherein the first set of service master selection criteria includes a resource availability condition.

42. The particular member of claim 40, wherein the first set of service master selection criteria includes a logical expression that is to be evaluated.

43. The particular member of claim 40, wherein the first set of service master selection criteria includes a software version specification.

44. The particular member of claim 40, wherein the first set of members contains members that provide the first service.

45. The particular member of claim 40, wherein a second service provided by the distributed computing system has a second set of service master selection criteria associated therewith, wherein the second set of service master selection criteria is different from the first set of service master selection criteria, and wherein the mechanism for selecting further comprises:
a mechanism for determining a second set of one or more members that are eligible to be service master for the second service;
a mechanism for applying the second set of service master selection criteria to the second set of members to derive a second set of one or more qualified members that are qualified to be service master for the second service; and
a mechanism for establishing a member from the second set of qualified members as service master for the second service.

46. The particular member of claim 45, wherein the first set of members contains members that provide the first service, wherein the second set of members contains members that provide the second service, and wherein the first set of members and the second set of members can have one or more members in common such that one or more members can provide both the first service and the second service.

47. The particular member of claim 45, wherein the same member can be established as service master for both the first service and the second service.

48. The particular member of claim 39, wherein the distributed computing system further comprises a persistent repository, the repository comprising information specifying the plurality of services provided by the distributed computing system, and which services are provided by which members, and wherein the mechanism for selecting comprises:
a mechanism for consulting the repository to determine a set of one or more members that are eligible to be service master for a first service; and
a mechanism for establishing a member in the set of members as service master for the first service.

49. The particular member of claim 48, wherein the set of members that are eligible to be service master for the first service contains members that provide the first service.

50. The particular member of claim 39, wherein the distributed computing system further comprises a persistent repository, the repository comprising information specifying the plurality of services provided by the distributed computing system, which services are provided by which members, and one or more sets of service master selection criteria, with each set of service master selection criteria associated with at least one of the plurality of services, and wherein the mechanism for selecting comprises:
a mechanism for consulting the repository to determine a first set of one or more members that are eligible to be service master for a first service;
a mechanism for applying a first set of service master selection criteria associated with the first service to the first set of members to derive a first set of one or more qualified members that are qualified to be service master for the first service; and
a mechanism for establishing a member from the first set of qualified members as service master for the first service.

51. The particular member of claim 50, wherein the first set of members contains members that provide the first service.

52. The particular member of claim 50, wherein the mechanism for selecting further comprises:
a mechanism for consulting the repository to determine a second set of one or more members that are eligible to be service master for a second service;
a mechanism for applying a second set of service master selection criteria associated with the second service to the second set of members to derive a second set of one or more qualified members that are qualified to be service master for the second service; and
a mechanism for establishing a member from the second set of qualified members as service master for the second service;
wherein the second set of service master selection criteria is different from the first set of service master selection criteria.

53. The particular member of claim 52, wherein the first set of members contains members that provide the first service, wherein the second set of members contains members that provide the second service, and wherein the first set of members and the second set of members can have one or more members in common such that one or more members can provide both the first service and the second service.

54. The particular member of claim 52, wherein the same member can be established as service master for both the first service and the second service.

55. The particular member of claim 39, wherein the mechanism for selecting selects a first member to be service master for a first service, and wherein the particular member further comprises:
a mechanism for determining whether the first member should continue to be service master for the first service; and
a mechanism, which is invoked in response to a determination that the first member should not continue to be service master for the first service, for selecting another member to be service master for the first service.

56. The particular member of claim 39, wherein the mechanism for selecting selects a first member to be service master for a first service, wherein the first service has a first set of service master selection criteria associated therewith, and wherein the particular member further comprises:

a mechanism for applying the first set of service master selection criteria to the first member to determine whether the first member still qualifies to be service master for the first service; and a mechanism, which is invoked in response to a determination that the first member no longer qualifies to be service master for the first service, for selecting another member to be service master for the first service.

* * * * *

UNITED STATES PATENT AND TRADEMARK OFFICE
CERTIFICATE OF CORRECTION

PATENT NO. : 7,299,265 B2  Page 1 of 1
APPLICATION NO. : 10/455922
DATED : November 20, 2007
INVENTOR(S) : Chatterjee et al.

It is certified that error appears in the above-identified patent and that said Letters Patent is hereby corrected as shown below:

In column 8, line 48, delete "requester," and insert -- requestor, --, therefor.

In column 8, line 53, delete "requester." and insert -- requestor. --, therefor.

In column 8, line 57, after "request to" insert -- , --.

Signed and Sealed this

Second Day of September, 2008

JON W. DUDAS
*Director of the United States Patent and Trademark Office*